UNITED STATES PATENT OFFICE.

JOHN B. BERNADOU, OF THE UNITED STATES NAVY.

SMOKELESS POWDER.

SPECIFICATION forming part of Letters Patent No. 652,505, dated June 26, 1900.

Original application filed November 17, 1898, Serial No. 696,725. Divided and this application filed December 8, 1899, Serial No. 739,654. (No specimens.)

*To all whom it may concern:*

Be it known that I, JOHN B. BERNADOU, lieutenant, United States Navy, have invented certain new and useful Improvements in Colloids, of which the following is a specification.

My invention relates to an improved colloid, which may be used after drying as a gunpowder or as an explosive cementing agent or binder in connection with other materials used in the manufacture of smokeless powders.

I have discovered that if ether-alcohol-soluble nitro-cellulose be immersed in ethyl ether and be then exposed to a temperature of about that of freezing water or lower, the nitro-cellulose will go into solution or form a jelly with the ether, resulting in the formation of a colloid. Once in solution or jelly the nitro-cellulose will not again revert to its original cellular form, but constitutes a colloid, which may be employed when dried as a powder or as a cementing agent or binder in the manufacture of powders containing other ingredients.

The property of dissolving in ether upon application of cold is common to all forms of soluble nitro-cellulose. By "soluble nitro-cellulose" I mean those nitro-celluloses that will go into solution at ordinary atmospheric temperatures in a mixture of two parts, by weight, (about,) of ethyl ether and in one part, by weight, (about,) of ethyl alcohol. The property above referred to is possessed by soluble nitro-hydro-cellulose, prepared by nitrating hydro-cellulose, while the form of soluble nitro-cellulose known as "pyro-cellulose," prepared by the hot process of nitration, also possess the same property. Ordinary forms of soluble nitro-cellulose prepared under the old processes, which have been unduly heated or treated with alkali, causing partial disintegration or modification of their substance, display the phenomenon imperfectly, yet will colloid with ether sufficiently under the influence of cold to illustrate the principle.

In my present invention I limit myself to those forms of the material capable of practical use, as gunpowder—viz., forms of high nitration—*i. e.*, of high oxygen power, which evolve large volumes of gases on combustion.

I define ether-alcohol-soluble nitro-cellulose of high nitration—*i. e.*, of high oxygen power—as nitro-cellulose soluble at ordinary atmospheric temperatures in a mixture of two parts, by weight, of ethylic ether and one part, by weight, of ethyl alcohol and possessing a proportionate content of oxygen equal to or about that possessed by an ether-alcohol-soluble nitro-cellulose corresponding to a formula $C_{30}H_{38}(NO_2)_{12}O_{25}$.

With the soluble nitro-cellulose colloid above described may be mixed insoluble nitro-cellulose or military guncotton, thus forming a powerful and smokeless explosive material.

The employment of nitro-celluloses soluble in ether alcohol is limited to forms of that material capable of practical use, as gunpowder—namely, forms of high nitration— *i. e.*, of high oxygen power, which evolve large volumes of gases on combustion.

Decomposition products of nitro-cellulose vary with temperatures, pressures, modes of ignition, and conditions of confinement, so that no definite decomposition products can be predicated for nitro-cellulose colloids employed for powders, and no claim for such decomposition product is herein made.

Nitration of cellulose is the process of introducing into its composition by substitution the radical nitryl, ($NO_2$.) In an application for patent on smokeless powder, Serial No 696,725, filed November 17, 1898, of which the present application is a division, the method of making smokeless powders as herein described is fully set forth, and reference is made to said application for a full description thereof.

I claim—
An ether colloid of ether-alcohol-soluble nitro-cellulose of high nitration, namely possessing a proportionate oxygen content equal to or above that possessed by ether-alcohol-soluble nitro-cellulose corresponding to a formula $C_{30}H_{38}(NO_2)_{12}O_{25}$.

JOHN B. BERNADOU.

Witnesses:
GEORGE W. SELTZER,
CHARLES A. RUTTER.